(12) United States Patent
Kim et al.

(10) Patent No.: US 9,803,034 B2
(45) Date of Patent: Oct. 31, 2017

(54) HIGHLY FUNCTIONAL GRAFT COPOLYMER AND METHOD FOR PREPARING THE SAME

(75) Inventors: Dong Hyun Kim, Cheonan-si (KR); Joon Chul Lee, Hwaseong-si (KR); Hyun Ki Kim, Tongyeong-si (KR); Tae Wan Kim, Cheonan-si (KR)

(73) Assignee: KOREA INSTITUTE OF INDUSTRIAL TECHNOLOGY, Cheonan-si, Chungcheon (KR)

( * ) Notice: Subject to any disclaimer, the term of this patent is extended or adjusted under 35 U.S.C. 154(b) by 194 days.

(21) Appl. No.: 14/347,212

(22) PCT Filed: Dec. 30, 2011

(86) PCT No.: PCT/KR2011/010406
§ 371 (c)(1),
(2), (4) Date: Mar. 25, 2014

(87) PCT Pub. No.: WO2013/058438
PCT Pub. Date: Apr. 25, 2013

(65) Prior Publication Data
US 2014/0235795 A1    Aug. 21, 2014

(30) Foreign Application Priority Data

Oct. 18, 2011 (KR) .................. 10-2011-0106595

(51) Int. Cl.
| | | |
|---|---|---|
| *C08F 255/02* | (2006.01) | |
| *C08F 4/52* | (2006.01) | |
| *C08F 220/16* | (2006.01) | |
| *C08F 257/02* | (2006.01) | |
| *C08F 255/04* | (2006.01) | |
| *C08F 255/08* | (2006.01) | |

(52) U.S. Cl.
CPC .............. *C08F 4/52* (2013.01); *C08F 220/16* (2013.01); *C08F 255/02* (2013.01); *C08F 257/02* (2013.01); *C08F 255/04* (2013.01); *C08F 255/08* (2013.01)

(58) Field of Classification Search
CPC ........ C08F 4/52; C08F 4/6192; C08F 255/02; C08F 255/04; C08F 255/08; C08F 257/02
See application file for complete search history.

(56) References Cited

U.S. PATENT DOCUMENTS

| | | |
|---|---|---|
| 5,608,009 A | 3/1997 | Machida et al. |
| 5,866,659 A | 2/1999 | Chung et al. |
| 5,922,823 A | 7/1999 | Sagane et al. |
| 5,929,185 A | 7/1999 | Rösch et al. |
| 6,015,862 A * | 1/2000 | Chung ................. C08F 212/14 525/279 |
| 6,414,102 B2 * | 7/2002 | Chung ......................... 525/184 |

OTHER PUBLICATIONS

ASTM D638-10 Standard Test Method for Tensile Properties of Plastics, ASTM International, 2012.*
http://web.archive.org/web/20110811093017/http://glassproperties.com/tg/, Measurement of the Glass Transition Temperature Tg, Aug. 2011.*

* cited by examiner

*Primary Examiner* — Roberto Rabago
(74) *Attorney, Agent, or Firm* — Seed Intellectual Property Law Group; Hai Han

(57) ABSTRACT

This invention relates to a highly functional graft copolymer and a method of preparing the same, and more particularly, to a highly functional graft copolymer including a main chain of a highly elastic ethylene-based terpolymer including, at a predetermined molar ratio, an ethylene unit, an α-olefin unit having 6 to 12 carbon atoms, and at least one functional unit selected from the group consisting of divinylbenzene and p-methylstyrene, and a side chain of a polar polymer for imparting functionality, and to a method of preparing the highly functional graft copolymer by performing anionic polymerization after catalytic polymerization using a metallocene catalyst.

14 Claims, No Drawings

ND METHOD FOR
HIGHLY FUNCTIONAL GRAFT COPOLYMER AND METHOD FOR PREPARING THE SAME

TECHNICAL FIELD

The present invention relates to a highly functional graft copolymer and a method of preparing the same, and more particularly, to a highly functional graft copolymer which includes a main chain of a highly elastic ethylene-based terpolymer including, at a predetermined molar ratio, an ethylene unit, an α-olefin unit having 6 to 12 carbon atoms, and at least one functional unit selected from the group consisting of divinylbenzene and p-methylstyrene, and a side chain of a polar polymer for imparting functionality, and to a method of preparing the highly functional graft copolymer by performing anionic polymerization after catalytic polymerization using a metallocene catalyst.

BACKGROUND ART

Because polyolefin, such as polyethylene (PE), polypropylene (PP), etc., is lightweight and inexpensive and has superior properties and processability, it is widely utilized in a variety of fields including food packaging, medical/cosmetic/pharmaceutical containers, car parts, communication/electric device parts, building/construction materials, agricultural materials, medical devices, etc. and thus occupies a very important position as a general-purpose resin. However, needs for properties of polyolefin are still more diversified these days. For example, there are demands for polyolefin having properties which do not exist in conventional polyolefin, including polyolefin having high heat resistance or polyolefin having a flexible texture such as soft polyvinyl chloride, and also polyolefin imparted with high functionality such as printability, coatability, adhesion and compatibility with a polymer having different polarity.

An ethylene-based copolymer is originally non-polar because it has no polar group in the molecule thereof, and thus has poor attachment strength to a highly polar material such as a metal or polar resin.

For this reason, when an ethylene-based copolymer is bound with a highly polar material, the surface of the ethylene-based copolymer has to be treated using firing treatment, corona discharge treatment, primer treatment, etc., and thus complicated preparation problems may occur.

A metallocene compound indicates a Group 4 transition metal compound having one or two cyclopentadienyl groups as a ligand, and may be activated using methyl aluminoxane or a boron compound and may thus be used as a catalyst for olefin polymerization. Because such a metallocene catalyst has a uniform active site, the molecular weight distribution of a polymer is narrow, copolymerization becomes easy, and the distribution of a second monomer is uniform. In the case of propylene polymerization, the stereostructure of the polymer may be advantageously adjusted depending on the symmetry of the catalyst. In particular, although only isotactic polypropylene may be prepared using a conventional Ziegler-Natta catalyst, the use of the metallocene catalyst enables preparation of polypropylene having different tacticities such as isotatic, syndiotactic, atactic, hemiisotactic, etc. For example, syndiotactic polypropylene synthesized using metallocene is characterized in terms of low crystallinity, appropriate rigidity and hardness, high transparency and superior impact resistance.

The metallocene catalyst is actively utilized to produce copolymers of ethylene and α-olefin, such as LLDPE, VLDPE, EPM and EPDM, cycloolefin copolymers (COC) of ethylene and cycloolefin or α-olefin and cycloolefin, and copolymers of ethylene and α-olefin and styrene. The catalytic conditions required commonly for preparation of such products should have high activity and high reactivity for the second monomer, and should enable the preparation of a polymer having a uniform second monomer distribution.

Meanwhile, because the metallocene catalyst is more expensive compared to a conventional Ziegler-Natta catalyst, it is regarded as being economically valuable when having high activity. Especially in the case of a catalyst having good reactivity for the second monomer, a polymer having the second monomer in a large amount may be favorably obtained even when the second monomer is used in a small amount.

Anionic polymerization is comparatively complicated in terms of purification of monomer and solvent or because of the requirements for low temperature and high vacuum upon initiator handling and polymerization, but may very precisely control the molecular weight or molecular weight distribution of a polymer (M. Morton et al., *Rubber Chem. Technol*, 1975, 48, 359; M. Morton, "Anionic Polymerization, Principles and Practice", 1983, Academic Press, Inc., NY; M. Szwarc, "Carbanions, Living Polymers and Electron Transfer Process", 1968, Wiley (INterscience), NY). Since a living mechanism has been found in the polymerization for some kinds of monomers by Szwarc, systematic study for anionic living polymerization has been carried out and various kinds of monomers have been polymerized using anionic polymerization. In domestic cases, thorough research into various kinds of polymer blends is ongoing. In this research, there is a need for much of the same material, such as a block copolymer or a polymer standard material having low molecular weight distribution or accurately controlled molecular weight, but there is extremely lack of study thereto. The styrene-based standard material or the styrene-diene-based block copolymer may be supplied from abroad but is very limited in terms of molecular weight or block size, and samples for polar polymers cannot be ensured at all. Although synthesis of some block copolymers using anionic polymerization has been performed in recent years, synthesis is mostly carried out using a break seal method, and thus the amount of the prepared sample approximates to 10 g. Accordingly, research into mass synthesis by anionic polymerization is required. Culminating in the present invention, intensive and thorough research carried out by the present inventors aiming to solve the problems encountered in the related art, resulted in the finding that an ethylene monomer, an α-olefin monomer having 6 to 12 carbon atoms, and at least one functional monomer selected from the group consisting of divinylbenzene and p-methylstyrene may be polymerized at a predetermined molar ratio using a metallocene catalyst to thus prepare a main chain, and then a polar polymer for imparting functionality may be subjected to anionic polymerization and thus introduced as a side chain, thereby synthesizing a highly elastic ethylene-based pluralistic copolymer composed of a highly elastic main chain and a graft side chain for imparting functionality, with superior mechanical strength, such as scratch resistance, hardness, elongation and fracture strength.

DISCLOSURE

Technical Problem

An object of the present invention is to provide a highly functional graft copolymer, which includes a main chain of a highly elastic ethylene-based terpolymer and a side chain of a polar polymer for imparting functionality.

Another object of the present invention is to provide a method of preparing the highly functional graft copolymer.

Technical Solution

In order to accomplish the above objects, the present invention provides a graft copolymer, including a main chain of a highly elastic ethylene-based terpolymer including 60~95 mol % of an ethylene unit, 3~35 mol % of an α-olefin unit having 6 to 12 carbon atoms, and 0.5~5 mol % of at least one functional unit selected from the group consisting of divinylbenzene and p-methylstyrene; and a side chain of a polar polymer; and having a glass transition temperature of −60~−20° C. and a fracture strength of 20~60 MPa.

Useful in the main chain of the present invention, the α-olefin unit having 6 to 12 carbon atoms may include, for example, hexene, heptene, octene, etc., but is not limited thereto.

Useful in the main chain of the present invention, at least one functional unit selected from the group consisting of divinylbenzene and p-methylstyrene functions as a reactive site that is able to graft a chain for imparting additional functionality to the main chain of the highly elastic ethylene-based terpolymer according to the present invention. Briefly, the polar polymer may be grafted as the side chain at the position of the functional unit.

In the main chain of the present invention, if the amount of the ethylene unit is less than 60 mol %, preparation itself using metallocene catalytic polymerization may become difficult. In contrast, if the amount thereof is greater than 95 mol %, properties close to those of pure polyethylene may be undesirably exhibited.

In the main chain of the present invention, if the amount of the α-olefin unit having 6 to 12 carbon atoms is less than 3 mol %, elasticity of the copolymer may decrease because of the low content of the comonomer. In contrast, if the amount thereof is greater than 35 mol %, mechanical strength of the copolymer may drastically decrease, and thus the use range thereof may become narrow.

In the main chain of the present invention, if the amount of at least one functional unit selected from the group consisting of divinylbenzene and p-methylstyrene is less than 0.5 mol %, the position to which the functional group may be subsequently introduced may become small, making it difficult to prepare a highly functional material as desired. In contrast, if the amount of the functional unit is greater than 5 mol %, catalytic activity may drastically decrease and the molecular weight of the resulting copolymer may be lowered. Specifically, when the amount of the functional unit is greater than 5 mol %, catalytic activity is remarkably reduced and thus very low preparation efficiency may result, and the molecular weight of the prepared copolymer is decreased, and overall properties thereof become poor. Therefore, the amount of the functional unit is an important factor which should be appropriately controlled to achieve preferable preparation efficiency and properties of the highly elastic ethylene-based terpolymer prepared in the present invention.

Preferably, the main chain of the present invention includes 80~95 mol % of the ethylene unit, 4~18 mol % of the α-olefin unit having 6 to 12 carbon atoms, and 0.5~2 mol % of at least one functional unit selected from the group consisting of divinylbenzene and p-methylstyrene. In a specific embodiment, the main chain of the present invention was composed of 81~94 mol % of the ethylene unit, 5.2~17.8 mol % of the α-olefin unit having 6 to 12 carbon atoms, and 0.8~1.2 mol % of at least one functional unit selected from the group consisting of divinylbenzene and p-methylstyrene.

Useful in the side chain of the present invention, the polar polymer may include, for example, a polar polymer having at least one polar group selected from among OH group and $NH_2$ group, or an acrylate-based homopolymer or copolymer, but is not limited thereto. Specific examples of the polar polymer which may be employed in the side chain of the present invention may include, but are not limited to, hydroxylated polyisoprene, poly(methyl methacrylate) (PMMA), etc.

As used herein, the term "glass transition temperature" refers to a temperature at which the solid state of the graft copolymer according to the present invention is converted into a fluid liquid state, and indicates a temperature which initiates the fluidization of the crystalline portion. Unlike crystalline resin, resin having a sparse crystalline area has a glass transition temperature in lieu of a melting temperature. This resin exhibits a brittle mode like glass at a temperature below a glass transition temperature, whereas it shows a ductile mode like rubber at a temperature above a glass transition temperature.

The graft copolymer according to the present invention has a very low glass transition temperature to the extent of −60~−20° C. and thus exhibits outstanding elastomer resin properties with a ductile mode like rubber not only at room temperature but also at a low temperature of 0° C.

As used herein, the term "fracture strength" refers to strength at which the graft copolymer according to the present invention is not broken but is maintained in the presence of an external predetermined force, and namely indicates maximum stress at which the graft copolymer according to the present invention fails via fracture.

Preferably, the graft copolymer according to the present invention has a fracture strength of 30~50 MPa. In a specific embodiment, the fracture strength of the graft copolymer according to the present invention was 32~45 MPa.

The graft copolymer according to the present invention has very high fracture strength as indicated above. Preferably, the graft copolymer according to the present invention has a molecular weight distribution of 1~3.5.

As used herein, the term "molecular weight distribution" refers to a value obtained by dividing a weight average molecular weight (Mw) by a number average molecular weight (Mn).

Typically, a polymer is widely distributed from a low molecular weight to a high molecular weight. The molecular weight distribution which is wholly broadly dispersed around the average molecular weight is referred to as broad MWD. As the molecular weight distribution is broader, shear stress is decreased and thus viscosity is also lowered to thereby enhance processability but strength is deteriorated. In contrast, the molecular weight distribution which is narrowly dispersed is referred to as narrow MWD. In this case, the strength is enhanced but processability is deteriorated.

The graft copolymer according to the present invention has a molecular weight distribution of 1~3.5, which is comparatively narrow, and thus is enhanced in strength.

In the present invention, the molecular weight distribution of the polymer may be measured using a precipitation process, ultracentrifugation, column separation, and GPC (Gel Permeation Chromatography). As a simple process in addition thereto, an S.Ex (Stress Exponent) process may be used, in which, based on a correlation between the melting index and the molecular weight distribution, the melting index is measured and then the molecular weight distribution is determined.

The graft copolymer according to the present invention preferably has Tanδ of 0.1~0.5.

As used herein, the term "Tanδ (tangent delta)" refers to the ratio of a lost elastic modulus relative to a stored elastic modulus, and is used to measure viscoelastic properties of the polymer.

The graft copolymer according to the present invention, Tanδ of which is 0.1~0.5, has superior elastic properties.

In the present invention, Tanδ may be obtained by measuring the stored elastic modulus and the lost elastic modulus using a dynamic mechanical analysis process and calculating the ratio of the lost elastic modulus relative to the stored elastic modulus.

The graft copolymer according to the present invention preferably has a scratch resistance of 13 N or more, and more preferably 13~20 N.

As used herein, the term "scratch resistance" refers to a property which is resistant to scratch, and is a physical property associated with surface hardness.

The graft copolymer according to the present invention, having a scratch resistance of 13 N or more, exhibits superior surface hardness.

In the present invention, scratch resistance may be measured using a testing method for linear loading increase (1 to 50 N) such as ASTM D7027.

The graft copolymer according to the present invention preferably has a hardness of 60~90 A.

As used herein, the term "hardness" refers to the extent of hardening of the graft copolymer according to the present invention, and indicates Shore hardness.

Shore hardness is of A and D types, and A type is typically used to measure a soft material, and thus in the present invention, A type is adopted. Specifically, Shore hardness A type is measured using a blunt indenter, and falls in the range from 20 A to 90 A.

The graft copolymer according to the present invention, having a hardness of 60~90 A, exhibits superior hardness.

The graft copolymer according to the present invention preferably has an elongation of 500~1,200%.

As used herein, the term "elongation (δ)" refers to the ratio of elongation of a material upon tensile testing, wherein when the original gauge length of a test sample is $l_0$ and the gauge length at fracture is $l_1$, $\delta=(l_1-l_0)/l_0\times100(\%)$.

The graft copolymer according to the present invention, having an elongation of 500~1,200%, exhibits superior elongation properties.

The graft copolymer according to the present invention has the main chain of the highly elastic ethylene-based terpolymer and thus exhibits high weight average molecular weight, low glass transition temperature, comparatively narrow molecular weight distribution and comparatively low Tanδ, thereby exhibiting superior strength and excellent elastic properties. Furthermore, owing to the side chain of the polar polymer for imparting functionality, outstanding functionalities including high fracture strength, scratch resistance, hardness and elongation may be manifested. The copolymer according to the present invention having the above properties may be applied to a variety of part materials requiring elasticity and functionality, suitable for use in cars, shoes, adhesives, sealants, coatings, electric wires and cable jackets, medical supplies and tools.

In addition, the present invention provides a method of preparing the graft copolymer including the following steps:

1) polymerizing 60~95 mol % of an ethylene monomer, 3~35 mol % of an α-olefin monomer having 6 to 12 carbon atoms, and 0.5~5 mol % of at least one functional monomer selected from the group consisting of divinylbenzene and p-methylstyrene using a metallocene catalyst (step 1); and 2) adding a polymer obtained in step 1 with a polar monomer and performing anionic polymerization (step 2).

Step 1 is a process of polymerizing 60~95 mol % of an ethylene monomer, 3~35 mol % of an α-olefin monomer having 6 to 12 carbon atoms, and 0.5~5 mol % of at least one functional monomer selected from the group consisting of divinylbenzene and p-methylstyrene using a metallocene catalyst, and thereby the ethylene monomer, the α-olefin monomer having 6 to 12 carbon atoms and the functional monomer are polymerized at a predetermined ratio using the metallocene catalyst, thus preparing a main chain of a highly elastic ethylene-based terpolymer composed of ethylene/α-olefin having 6 to 12 carbon atoms/functional monomer.

The description of the α-olefin monomer having 6 to 12 carbon atoms and at least one functional monomer selected from the group consisting of divinylbenzene and p-methylstyrene is the same as that of the α-olefin unit having 6 to 12 carbon atoms and at least one functional unit selected from the group consisting of divinylbenzene and p-methylstyrene in the description of the ethylene-based terpolymer.

In the present invention, the catalyst used for terpolymerization of the ethylene monomer, the α-olefin monomer having 6 to 12 carbon atoms and the functional monomer is a metallocene catalyst as a coordinating anion type catalyst.

In the present invention, the metallocene catalyst is configured such that a center metal is a Group 4 transition metal and a ligand is cyclopentadienyl or a derivative thereof; fluorenyl or a derivative thereof; or indenyl or a derivative thereof, and the catalyst has a bridge (ansa) structure or a non-bridge structure.

Preferably, the metallocene catalyst has a center metal of Ti or Zr and a ligand of indenyl or its derivative, and has a bridge (ansa) structure, in terms of catalytic activity of the polymerization.

As used herein, the term "catalytic activity" refers to a numerical value obtained by dividing the yield (kg) of a polymer finally resulting from metallocene polymerization by the mole (μmol) of catalyst used and the time (hr).

In the present invention, the catalytic activity of the polymerization is 2,500 or more, and preferably 2,500~15,000.

In the present invention, the monomers and a solvent (the case where the solvent is used) before polymerization may be purified using vacuum distillation or by coming into contact with alumina, silica or molecular sieve. Also, impurities may be removed using a trialkyl aluminum compound, an alkali metal, a metal alloy (especially, Na/K), etc.

The metallocene catalyst may include, but is not limited to, ethyl bis(indenyl)zirconium dichloride, etc.

The metallocene catalyst is preferably used together with an alkyl aluminoxane cocatalyst, an organic alkyl aluminum cocatalyst, a boron compound cocatalyst, or mixtures thereof.

The alkyl aluminoxane cocatalyst is selected from the group consisting of methyl aluminoxane, ethyl aluminoxane, propyl aluminoxane, butyl aluminoxane and isobutyl aluminoxane.

The organic alkyl aluminum cocatalyst is selected from the group consisting of trimethylaluminum, triethylaluminum and diisobutylaluminum chloride.

The boron compound cocatalyst is selected from the group consisting of tris(pentafluorophenyl)borane, N,N-dimethylanilium tetrakis(pentafluorophenyl)borate, and triphenylmethyliniumtetrakispentafluoroborate. In step 1, the polymerization is preferably performed at 20° C. or higher, and more preferably at 20~70° C. If the polymerization is performed at a temperature less than the lower limit of the polymerization temperature, catalytic activity may drastically decrease, and a copolymer having low molecular weight may result.

In step 1, the polymerization is preferably performed for a period of time ranging from 20 min to 1 hr. If the polymerization is performed for a period of time shorter than the lower limit of the polymerization time, catalytic activity may drastically decrease, and a copolymer having low molecular weight may result. In contrast, if the polymerization is performed for a period of time longer than the upper limit of the polymerization time, the ethylene content in the copolymer may be increased to be very high, undesirably decreasing elasticity. Hence, the polymerization time is an important factor which should be appropriately controlled in terms of preferable preparation efficiency and properties of the main chain of the highly elastic ethylene-based terpolymer prepared in the present invention.

Step 2 is a process of adding the polymer obtained in step 1 with the polar monomer and performing anionic polymerization. Using anionic polymerization, the polar monomer is graft polymerized to the main chain of the highly elastic ethylene-based terpolymer obtained in step 1, thus introducing the polar polymer as the side chain.

Useful in the side chain of the present invention, the polar monomer may include, but is not limited to, a polar monomer having at least one polar group selected from among OH group and $NH_2$ group, or at least one acrylate-based monomer. Specific examples of the polar monomer usable in the side chain of the present invention may include, but are not limited to, hydroxylated isoprene, methyl methacrylate, etc.

In the present invention, an initiator used for anionic polymerization of the polar monomer produces anions which are then coupled with the monomer to thus initiate the anionic polymerization, or transfers electrons to thus initiate the anionic polymerization.

Specific examples of the initiator for anionic polymerization may include, but are not limited to, an alkali metal suspension, an alkyl lithium reagent, an aryl lithium reagent, a Grignard reagent, alkylated aluminum, an organic radical anion, a transition metal π-allyl complex and an ionization radiation.

In step 2, the polymerization is preferably performed at 0° C. or less, and more preferably −20~0° C. If the polymerization is performed at a temperature less than the lower limit of the polymerization temperature, mass production may become difficult due to low temperature. In contrast, if the polymerization is performed at a temperature higher than the upper limit of the polymerization temperature, polymerization yield may decrease.

In step 2, the polymerization is preferably performed for a period of time ranging from 20 min to 1 hr. If the polymerization is performed for a period of time shorter than the lower limit of the polymerization time, a copolymer having low molecular weight may result. In contrast, if the polymerization is performed for a period of time longer than the upper limit of the polymerization time, productivity may decrease.

The method of preparing the graft copolymer according to the present invention makes it easy to prepare the graft copolymer having superior properties and is thus economically preferable, wherein the graft copolymer has the main chain of the highly elastic ethylene-based terpolymer prepared under mild conditions instead of using expensive reagents or severe reaction conditions and thus attains high weight average molecular weight, low glass transition temperature, comparatively narrow molecular weight distribution and comparatively low Tanδ, thereby exhibiting superior strength and excellent elastic properties, and as well, the graft copolymer has outstanding functionality including high fracture strength, scratch resistance, hardness and elongation owing to the side chain of the polar polymer for imparting functionality.

Advantageous Effects

According to the present invention, a highly elastic ethylene-based pluralistic copolymer can be prepared, which includes a highly elastic main chain and a graft side chain for imparting functionality and has high weight average molecular weight with superior mechanical strength, such as scratch resistance, hardness, elongation and fracture strength, by polymerizing, at a predetermined molar ratio, an ethylene monomer, an α-olefin monomer having 6 to 12 carbon atoms, and at least one functional monomer selected from the group consisting of divinylbenzene and p-methylstyrene using a metallocene catalyst to thus prepare a main chain and then subjecting a polar polymer for imparting functionality to anionic polymerization to thus be introduced as a side chain. The copolymer having high elasticity and superior mechanical strength, such as scratch resistance, hardness, elongation and fracture strength can be widely applied to a variety of part materials requiring elasticity and functionality, suitable for use in cars, shoes, adhesives, sealants, coatings, electric wires, cable jackets, medical supplies and tools.

MODE FOR INVENTION

A better understanding of the present invention may be obtained through the following examples which are set forth to illustrate, but are not to be construed to limit the present invention.

EXAMPLES 1 to 8

Preparation of Inventive Copolymer

Into a 100 ml glass reactor equipped with a stirrer, toluene, ethylene, α-olefin such as decene or the like, and a functional monomer such as p-methylstyrene were added at a mixing ratio as shown in Table 1 below at room temperature. The amount of added toluene was adjusted so that the total volume of ethylene, α-olefin such as hexene or the like, a functional monomer such as p-methylstyrene, and toluene was 30 ml. The temperature of the reactor was adjusted to 30° C., and 5 μmol ethyl bis(indenyl)zirconium dichloride $(Et(Ind)_2ZrCl_2)$ as a catalyst and methyl aluminoxane as a cocatalyst weighed at a molar ratio of 2000 relative to the catalyst were added to the toluene solution, and polymerization was performed at 30° C. for 30 min. After 60 min, the polymerization was terminated by direct addition of methanol and hydrochloric acid in small amounts. The reaction product was separated, and dried under reduced pressure at 30° C. for 24 hr, thus obtaining a highly elastic ethylene-based terpolymer.

The highly elastic ethylene-based terpolymer thus obtained was added with a polar monomer such as hydroxylated isoprene or methyl methacrylate at a mixing ratio as shown in Table 1 below and subjected to anionic polymerization.

Specifically, in the case of hydroxylated isoprene, anionic polymerization was performed using tetrahydrofuran (THF) as a solvent and secondary butyllithium (sec-BuLi) as an initiator. Also, the amount of added THF was adjusted so that the total volume of the highly elastic ethylene-based terpolymer, hydroxylated isoprene and THF was 100 ml. The temperature of the reactor was adjusted to −10° C., and 0.002 mol sec-BuLi as the initiator was added to the THF solution, and polymerization was performed at −10° C. for 60 min. After 60 min, the polymerization was terminated by immersion in methanol. The reaction product was separated, and dried under reduced pressure at 60° C. for 48 hr, yielding a graft copolymer.

On the other hand, in the case of methyl methacrylate, anionic polymerization was performed using toluene as a solvent and tertiary butyllithium (tert-BuLi)/2,6-di-tert-butyl-4-methylphenoxy)diisobutylaluminum (Al(BHT)(iB)$_2$) as an initiator. Also, the amount of added toluene was adjusted so that the total volume of the highly elastic ethylene-based terpolymer, methyl methacrylate and toluene was 100 ml. The temperature of the reactor was adjusted to −10~0° C., and 0.4 mol tert-BuLi/(2,6-di-tert-butyl-4-methylphenoxy)diisobutylaluminum (Al(BHT)(iB)$_2$) as the initiator was added to the toluene solution, and polymerization was performed at −10~0° C. for 60 min. After 60 min, the polymerization was terminated by immersion in methanol. The reaction product was separated, and dried under reduced pressure at 60° C. for 48 hr, yielding a graft copolymer.

TABLE 1

| | Monomers of main chain (mol %) | | | Monomer of side chain (mol %) | |
|---|---|---|---|---|---|
| | Ethylene | Decene | p-Methylstyrene | Hydroxylated isoprene | Methyl methacrylate |
| Ex. 1 | 94 | 5.2 | 0.8 | 100 | 0 |
| Ex. 2 | 90 | 9.1 | 0.9 | 100 | 0 |
| Ex. 3 | 85 | 13.8 | 1.2 | 100 | 0 |
| Ex. 4 | 81 | 17.8 | 1.2 | 100 | 0 |
| Ex. 5 | 94 | 5.2 | 0.8 | 0 | 100 |
| Ex. 6 | 90 | 9.1 | 0.9 | 0 | 100 |
| Ex. 7 | 85 | 13.8 | 1.2 | 0 | 100 |
| Ex. 8 | 81 | 17.8 | 1.2 | 0 | 100 |

COMPARATIVE EXAMPLES 1 AND 2

Preparation of Comparative Copolymer

Individual copolymers were prepared in the same manner as in Examples 1 to 8, with the exception that individual monomers were added at a mixing ratio as shown in Table 2 below, and anionic polymerization was not performed.

TABLE 2

| | Monomers of main chain (mol %) | | | Monomer of side chain (mol %) | |
|---|---|---|---|---|---|
| | Ethylene | Decene | p-Methylstyrene | Hydroxylated isoprene | Methyl methacrylate |
| C. Ex. 1 | 85 | 13.8 | 1.2 | 0 | 0 |
| C. Ex. 2 | 81 | 17.8 | 1.2 | 0 | 0 |

TEST EXAMPLE 1

Comparison of Functionality of Inventive Copolymer and Comparative Copolymer

The inventive copolymers of Examples 1 to 8 and the comparative copolymers of Comparative Examples 1 and 2 were compared and measured for functionality. The results are shown in Table 3 below.

TABLE 3

| | Scratch resistance (N) | Hardness (Shore A) | Elongation (%) | Fracture strength (MPa) |
|---|---|---|---|---|
| Ex. 1 | 16 | 89 | 700 | 40 |
| Ex. 2 | 16 | 88 | 700 | 39 |
| Ex. 3 | 15 | 75 | 650 | 35 |
| Ex. 4 | 13 | 61 | 600 | 32 |
| Ex. 5 | 17 | 89 | 690 | 45 |
| Ex. 6 | 16 | 89 | 680 | 41 |
| Ex. 7 | 16 | 74 | 640 | 37 |
| Ex. 8 | 14 | 61 | 600 | 35 |
| C. Ex. 1 | 12 | 48 | 500 | 12 |
| C. Ex. 2 | 10 | 50 | 580 | 10 |

As is apparent from the results of Table 3, the inventive copolymers had higher scratch resistance, hardness and fracture strength compared to the comparative copolymers. Thus, the graft copolymers according to the present invention can be confirmed to be imparted with higher mechanical strength and functionality compared to the highly elastic ethylene-based terpolymers of the comparative examples without introducing a side chain via anionic polymerization.

The invention claimed is:

1. A graft copolymer, comprising:
   a main chain of an ethylene-based terpolymer comprising 80-95 mol % of an ethylene unit, 4-18 mol % of an α-olefin unit having 6 to 12 carbon atoms, and 0.5-2 mol % of p-methylstyrene; and
   a side chain of a polar polymer, wherein the polar polymer comprises at least one polar group selected from the group consisting of OH group and NH$_2$ group, wherein a molecular weight distribution (Mw/Mn) of the graft copolymer is 1-3.5.

2. The graft copolymer of claim 1, which has a scratch resistance of 13~20 N determined according to ASTM D7027.

3. The graft copolymer of claim 1, which has a hardness of 60~90 A, wherein the hardness is Shore hardness A.

4. A method of preparing a graft copolymer of claim 1, comprising: polymerizing 80 - 95 mol % of an ethylene monomer, 4-18 mol % of an α-olefin monomer having 6 to 12 carbon atoms, and 0.5-2 mol % of p-methylstyrene using a metallocene catalyst (step 1) to provide a polymer; and
   adding the polymer obtained in step 1 with a polar monomer and performing anionic polymerization (step 2) to provide the graft copolymer having a molecular weight distribution(Mw/Mn) of 1-3.5, wherein the polar monomer is a polar monomer having at least one polar group selected from the group consisting of OH group and NH2 group.

5. The method of claim 4, wherein the metallocene catalyst has a center metal comprising a Group 4 transition metal and a ligand comprising cyclopentadienyl or a derivative thereof fluorenyl or a derivative thereof or indenyl or a derivative thereof and has a bridge (ansa) structure or a non-bridge structure.

6. The method of claim 5, wherein the metallocene catalyst has a center metal of Ti or Zr and a ligand of indenyl or its derivative, and has a bridge (ansa) structure.

7. The method of claim 4, wherein a catalytic activity upon polymerizing is 2,500~15,000.

8. The method of claim 4, wherein the metallocene catalyst is used together with an alkyl aluminoxane cocatalyst, an organic alkyl aluminum cocatalyst, a boron compound cocatalyst, or mixtures thereof.

9. The method of claim 8, wherein the alkyl aluminoxane cocatalyst is selected from the group consisting of methyl aluminoxane, ethyl aluminoxane, propyl aluminoxane, butyl aluminoxane and isobutyl aluminoxane;

the organic alkyl aluminum cocatalyst is selected from the group consisting of trimethylaluminum, triethylaluminum and diisobutylaluminum chloride; and the boron compound cocatalyst is selected from the group consisting of tris(pentafluorophenyl)borane, N,N-dimethylanilium tetrakis(pentafluorophenyl)borate, and triphenylmethyliniumtetrakispentafluoroborate.

10. The method of claim 4, wherein the polymerizing in step 1 is performed at 20~70° C.

11. The method of claim 4, wherein the polymerizing in step 1 is performed for a period of time ranging from 20 min to 1 hr.

12. The method of claim 4, wherein an initiator for the anionic polymerization in step 2 is at least one selected from the group consisting of an alkali metal suspension, an alkyl lithium reagent, an aryl lithium reagent, a Grignard reagent, alkylated aluminum, an organic radical anion, a transition metal π-allyl complex and an ionization radiation.

13. The method of claim 4, wherein the polymerization in step 2 is performed at −20~0° C.

14. The method of claim 4, wherein the polymerization in step 2 is performed for a period of time ranging from 20 min to 3 hr.

* * * * *

UNITED STATES PATENT AND TRADEMARK OFFICE
CERTIFICATE OF CORRECTION

| | |
|---|---|
| PATENT NO. | : 9,803,034 B2 |
| APPLICATION NO. | : 14/347212 |
| DATED | : October 31, 2017 |
| INVENTOR(S) | : Dong Hyun Kim et al. |

Page 1 of 1

It is certified that error appears in the above-identified patent and that said Letters Patent is hereby corrected as shown below:

Column 10, Lines 62-67:
"The method of claim 4, wherein the metallocene catalyst has a center metal comprising a Group 4 transition metal and a ligand comprising cyclopentadienyl or a derivative thereof fluorenyl or a derivative thereof or indenyl or a derivative thereof and has a bridge (ansa) structure or a non-bridge structure."
Should read:
--The method of claim 4, wherein the metallocene catalyst has a center metal comprising a Group 4 transition metal and a ligand comprising cyclopentadienyl or a derivative thereof; fluorenyl or a derivative thereof; or indenyl or a derivative thereof; and has a bridge (ansa) structure or a non-bridge structure.--.

Signed and Sealed this
Eleventh Day of September, 2018

Andrei Iancu
*Director of the United States Patent and Trademark Office*